(12) United States Patent
Gramlow (10) Patent No.: US 9,873,300 B1
(45) Date of Patent: Jan. 23, 2018

(54) TRAILER HITCH APPARATUS WITH LATERAL SHIFT CAPABILITY (71) Applicant: Richard Gramlow, Fullerton, ND (US)

(72) Inventor: Richard Gramlow, Fullerton, ND (US)

(*) Notice: Subject to any disclaimer, the term of this patent is extended or adjusted under 35 U.S.C. 154(b) by 0 days.

(21) Appl. No.: 14/466,457

(22) Filed: Aug. 22, 2014

(51) Int. Cl.
*B60D 1/44* (2006.01)

(52) U.S. Cl.
CPC ...................... *B60D 1/44* (2013.01)

(58) Field of Classification Search
CPC ............. B60D 1/44; B60D 1/30; B60D 1/322
USPC ........... 280/472, 448, 411.1, 412, 413; 56/6, 56/13.8, 15.5, 16.2, 218, 13.6, 228
See application file for complete search history.

(56) References Cited

U.S. PATENT DOCUMENTS

| | | | |
|---|---|---|---|
| 2,259,753 A | 10/1941 | Kucera | |
| 2,600,016 A | 6/1952 | Miller | |
| 2,697,615 A | 12/1954 | Luebben | |
| 2,771,306 A | 11/1956 | Ash | |
| 4,440,417 A | 4/1984 | Kirchner | |
| 4,770,436 A | 9/1988 | Anderson | |
| 5,201,167 A * | 4/1993 | Rowse ................................ 56/6 |
| 5,255,756 A * | 10/1993 | Follmer ................ A01B 69/004 172/6 |
| 5,394,948 A | 3/1995 | Bunnell | |
| 5,706,901 A * | 1/1998 | Walters ................ A01B 71/066 172/439 |
| 6,443,475 B1 | 9/2002 | Fegley | |
| 6,865,465 B2 | 3/2005 | McClure | |
| 7,054,731 B1 | 5/2006 | Lange | |
| 7,128,330 B2 * | 10/2006 | Krauss ........................ 280/456.1 |
| 7,204,318 B2 | 4/2007 | Taylor | |
| 7,373,231 B2 | 5/2008 | McClure | |
| 8,764,042 B2 | 7/2014 | Afting | |
| 2007/0284851 A1 * | 12/2007 | Adcock .................... B60D 1/44 280/448 |
| 2012/0200064 A1 * | 8/2012 | Gallego et al. ............ 280/446.1 |
| 2012/0215410 A1 | 8/2012 | McClure | |
| 2015/0051795 A1 * | 2/2015 | Keys et al. ..................... 701/41 |

OTHER PUBLICATIONS

Sunco Acura Trak, brochure, Sunco Farm Equipment, 2 pgs., date unknown.
Acura Trak, Owner's Manual, 50 pages, Sunco Marketing, North Platte, NE; Dec. 1997.

* cited by examiner

*Primary Examiner* — Jacob D Knutson
(74) *Attorney, Agent, or Firm* — Jeffrey A. Proehl; Woods, Fuller, Shultz & Smith, P.C.

(57) ABSTRACT

A hitch apparatus for laterally shifting a hitch point of a trailer when towed behind a towing vehicle to effectively adjust an alignment of a longitudinal axis of the trailer with respect to a longitudinal axis of the towing vehicle. The hitch apparatus may comprise a pivot frame including a forward portion configured for attachment to a towing vehicle, a rearward portion configured for attachment to the trailer, and a central portion pivotally connecting the forward and rearward portions together. At least one actuator may be connected to at least two portions of the pivot frame to pivot the portions with respect to each other. Actuation of the actuator may move the forward portion of the pivot frame between shifted left condition and a shifted right condition with respect to the rearward portion and a trailer when the rearward portion is mounted on a trailer.

14 Claims, 6 Drawing Sheets

TRAILER HITCH APPARATUS WITH LATERAL SHIFT CAPABILITY

BACKGROUND

Field

The present disclosure relates to vehicle hitches and more particularly pertains to a new trailer hitch apparatus with lateral shift capability for suitably mounting on a trailer without requiring modification of the towing vehicle.

SUMMARY

In one aspect, the present disclosure relates to a hitch apparatus for laterally shifting a hitch point of a trailer when towed behind a towing vehicle to effectively adjust an alignment of a longitudinal axis of the trailer with respect to a longitudinal axis of the towing vehicle. The hitch apparatus may include a pivot frame extending between forward and rearward ends of the hitch apparatus. The pivot frame may comprise a forward portion configured for attachment to a towing vehicle, with the forward portion including a hitch connector structure configured to removably attach to a hitch device of a towing vehicle. The pivot frame may also comprise a rearward portion configured for attachment to the trailer, and a central portion pivotally connecting the forward and rearward portions together, with the forward portion being pivotally connected to the central portion to pivot about a substantially vertical axis and the rearward portion being pivotally connected to the central portion to pivot about a substantially vertical axis. The hitch apparatus may also include at least one actuator connected to at least two of said portions of the pivot frame and configured to pivot the portions with respect to each other. Actuation of the at least one actuator may move the forward portion of the pivot frame between shifted left condition and a shifted right condition with respect to the rearward portion and a trailer when the rearward portion is mounted on a trailer.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of the construction and to the arrangements of the components, as well as the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 7 thereof, a new a new trailer hitch apparatus with lateral shift capability embodying the principles and concepts of the disclosed subject matter will be described.

Applicant has recognized that existing devices that mount on tractors and other vehicles and move the tow point to one side or the other tend to interfere with the structure of the tow hitch on the tractor, thus limiting the types of implements that can be towed to those that utilize certain styles of hitches. Since not everything that is towed by a tractor requires side to side position control, the known devices form moving the tow point must be removed before towing these other trailers, or the device must be worked around when its presence is not really needed.

Applicant has thus devised a hitch apparatus that mounts on the tongue of a trailer or implement and thus does not need to be carries by the tractor when not needed or removed from the tractor when not used. The hitch apparatus of the disclosure is easily retrofitted to existing trailers and implements without modification to a tractor, and may be left in place on the trailer or switch to another trailer needing such lateral shift functionality.

Figure 1:
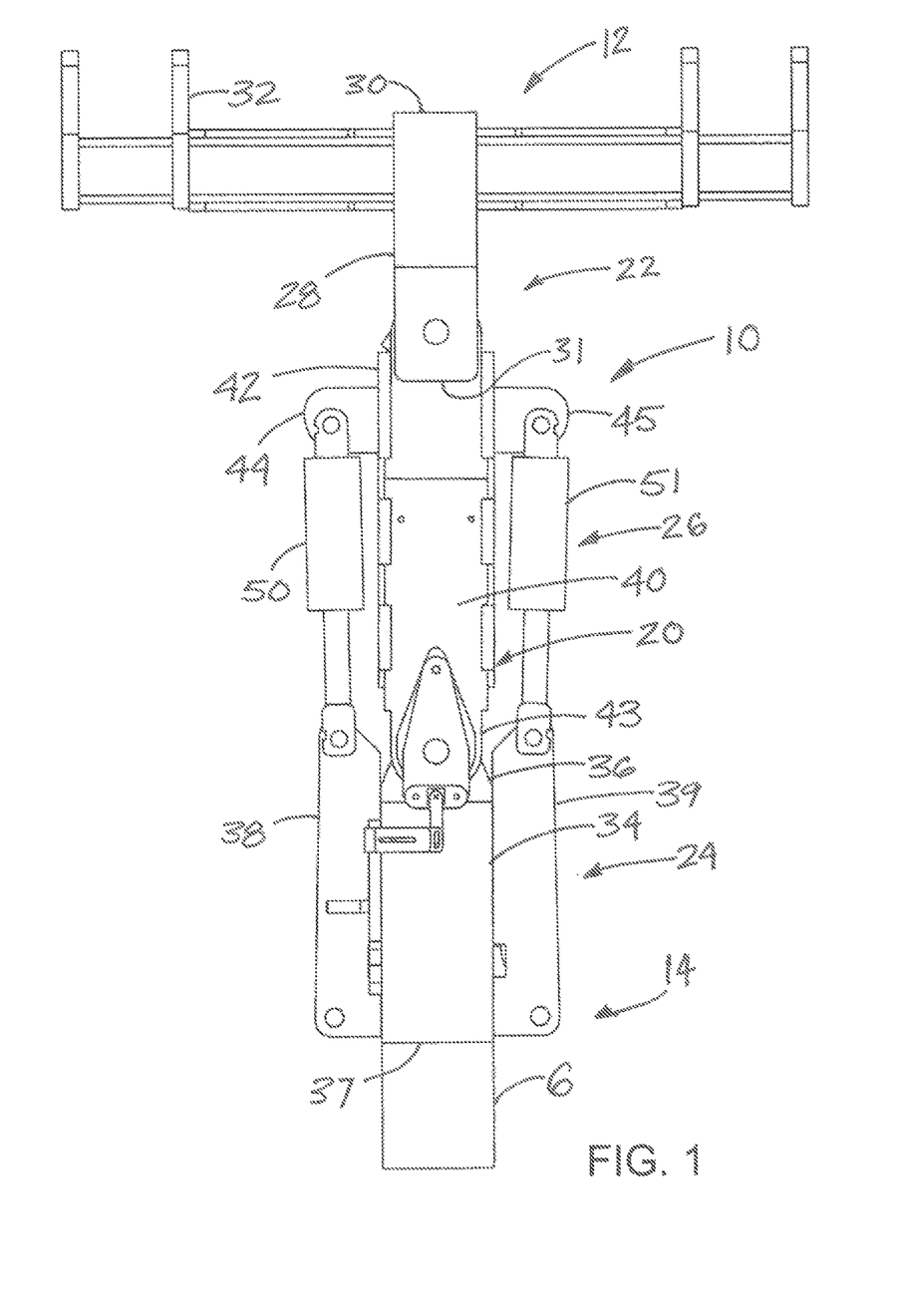
FIG. 1 is a schematic top view of a new trailer hitch apparatus with lateral shift capability according to the present disclosure, shown in a centered condition.
Figure 2:
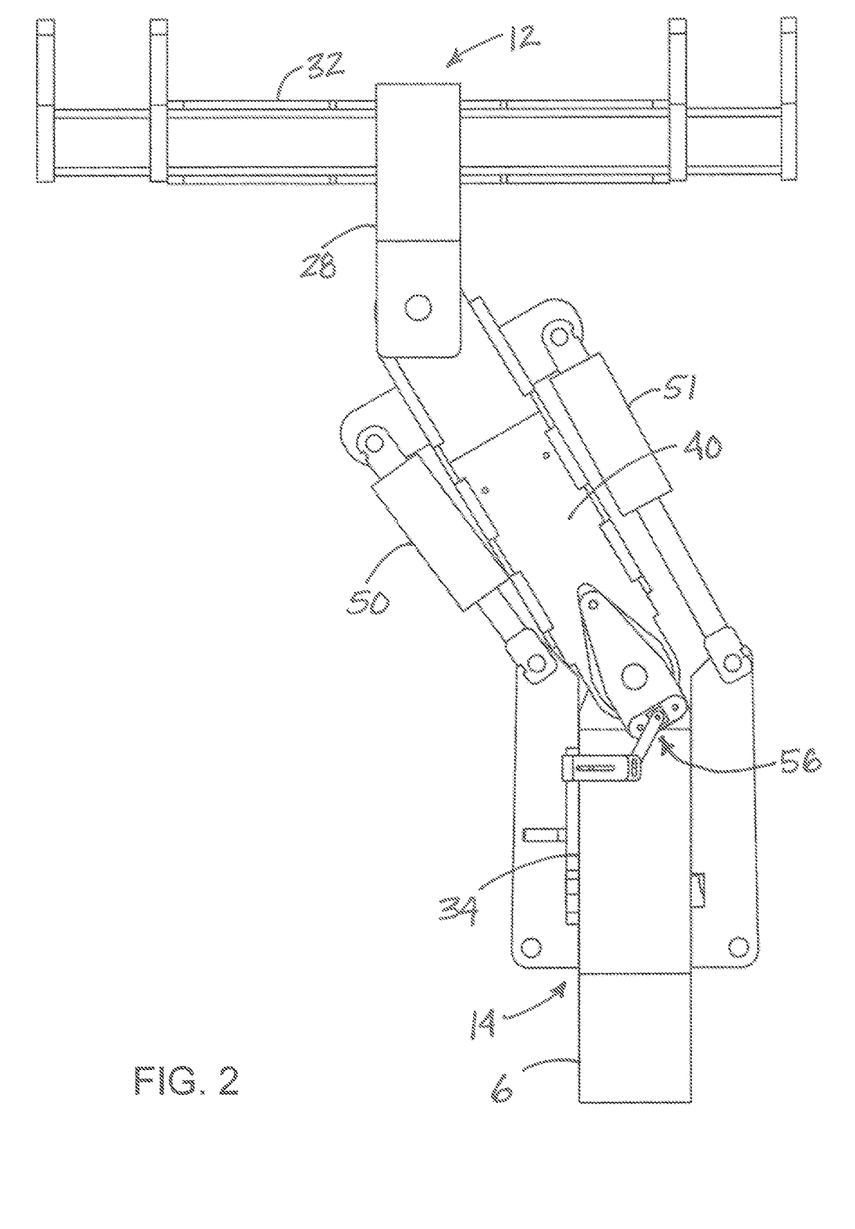
FIG. 2 is a schematic top view of the trailer hitch apparatus, according to an illustrative embodiment, shown in a shifted right condition.
Figure 3:
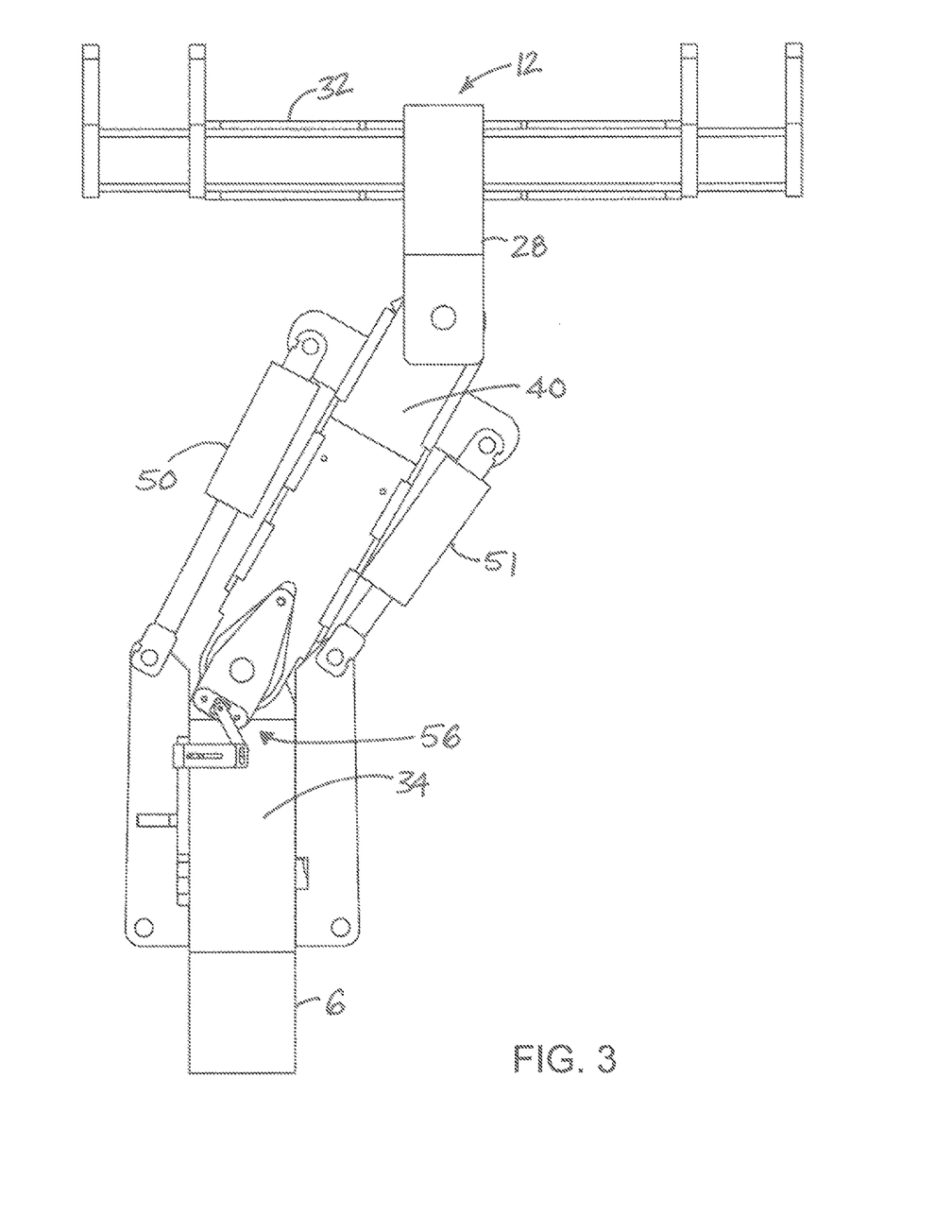
FIG. 3 is a schematic top view of the trailer hitch apparatus, according to an illustrative embodiment, shown in a shifted left condition.
Figure 4:
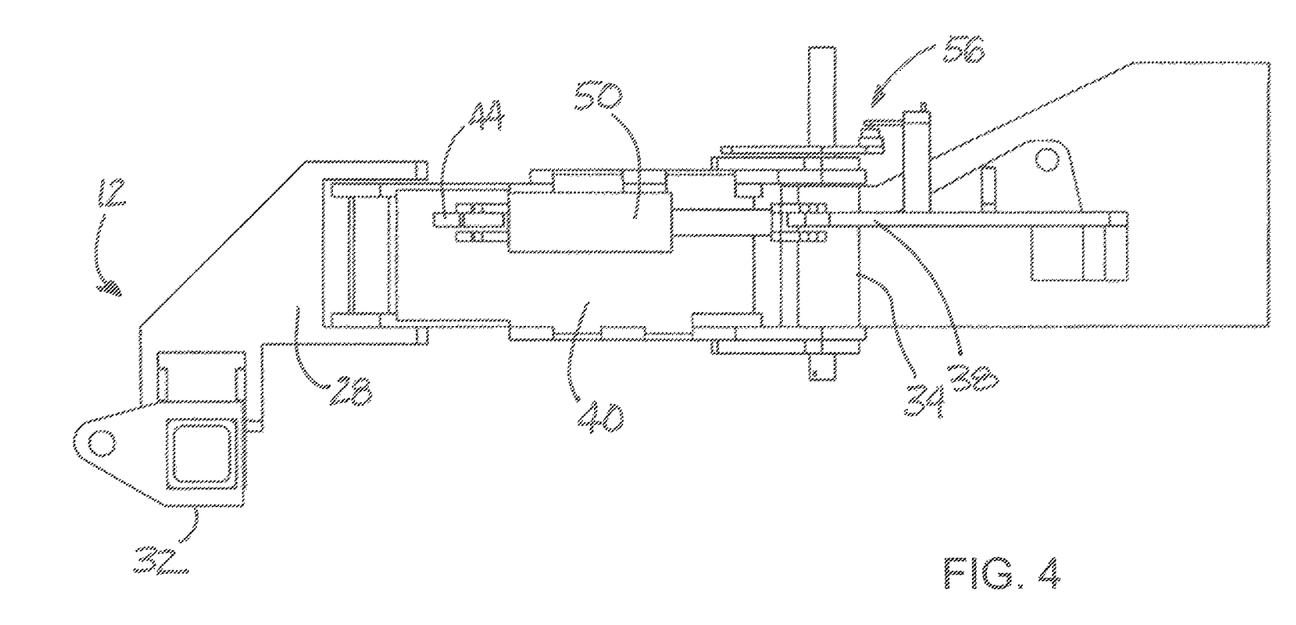
FIG. 4 is a schematic side view of the trailer hitch apparatus, according to an illustrative embodiment.
Figure 5A:
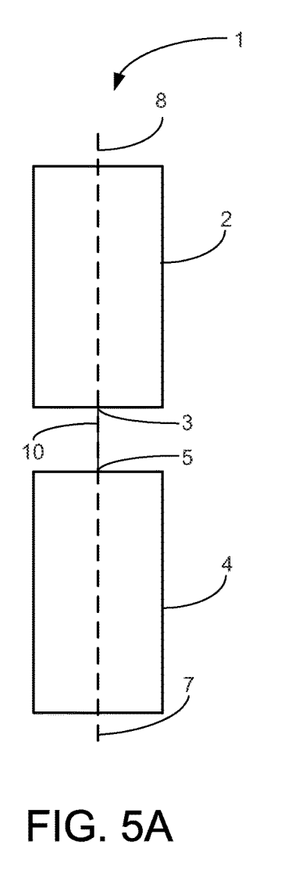
FIG. 5A is a schematic block diagram of a trailer hitch system, according to an illustrative embodiment, with the trailer shown in a centered position generally corresponding to the centered condition.
Figure 5B:
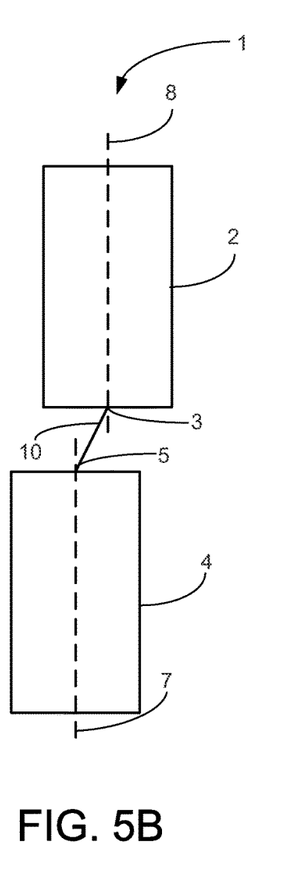
FIG. 5B is a schematic block diagram of the trailer hitch system, according to an illustrative embodiment, with the trailer shown in a shifted left position generally corresponding to the shifted left condition.
Figure 5C:
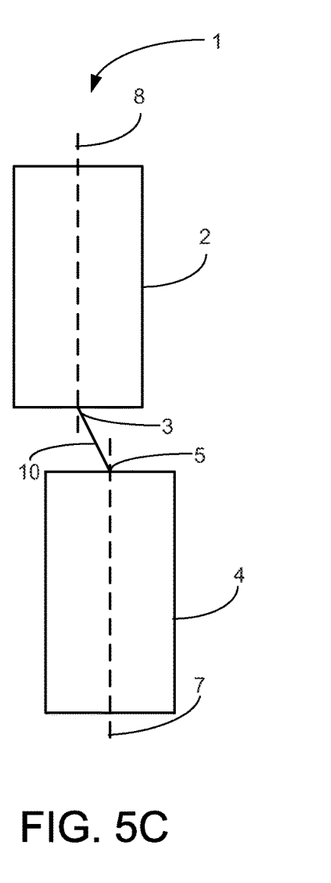
FIG. 5C is a schematic block diagram of the trailer hitch system, according to an illustrative embodiment, with the trailer shown in a shifted right position generally corresponding to the shifted right condition.

In one aspect, the disclosure relates to a system 1 that may include a towing vehicle 2, and the towing vehicle may have a hitch device 3, such as a two point or three point hitch, although other types of towing hitch configurations may be employed. The towing vehicle may comprise a tractor, although other types of vehicles may be employed. The system 1 may also include a trailer 4 which may have a tongue portion 5 with a front end 6. The trailer may comprise an agricultural implement, although other types of trailers may be employed.

Another aspect of the disclosure relates to a hitch apparatus 10 that may form a portion of the system 1, although not necessarily. The hitch apparatus 10 may permit lateral shifting of a hitch point of the trailer behind the towing vehicle to effectively adjust an alignment of a longitudinal axis 7 of the trailer 4 with respect to a longitudinal axis 8 of the towing vehicle 2. The hitch apparatus 10 may have a forward end 12 and a rearward end 14, and may be configured to orient the forward end 12 toward the towing vehicle 2 and the rearward end 14 toward the trailer 4.

The hitch apparatus 10 may include a pivot frame 20 that extends between the forward 12 and rearward 14 ends of the hitch apparatus. The pivot frame 20 may comprise a forward portion 22, a rearward portion 24, and a central portion 26 which may be attached to each of the forward and rearward portions. The forward portion 22 may be configured for attachment to a towing vehicle, and may include a forward member 28 which may be elongated in shape. The forward member 28 may have a fore end 30 and a rear end 31. The forward portion 22 may include a hitch connector structure 32 that is configured to removable attach to the hitch device 3 on the towing vehicle just as a trailer would typically attach to the vehicle without making changes to the structure of the vehicle or adding additional structure to the vehicle that would not be necessary to tow a conventional trailer. In some of the more preferable implementations, the hitch device on the towing vehicle may comprise a two point or three point hitch on the towing vehicle, and the hitch connector structure may comprise a two point connector structure configured to removably attach to the two point or three point hitch.

The rearward portion 24 of the pivot frame may be configured for attachment to the trailer, and may include a rearward member 34 which may be elongated in shape and have a fore end 36 and a rear end 37. The rearward member 34 may form a saddle with an opening for receiving a portion of the tongue portion 5 of the trailer 4. The rearward portion 24 may also have a pair of rear mounting tabs 38, 39 extending from opposite sides of the rearward member 34, and the tabs 38, 39 may extending laterally from the member 34.

The central portion 26 may pivotally connect the forward 22 and rearward 24 portions of the pivot frame together. The forward portion 22 may be pivotally connected to the central portion 26 to pivot about a substantially vertical axis and the rearward portion 24 may be pivotally connected to the central portion to pivot about a substantially vertical axis. The central portion 26 may include a central member 40 which may also be elongated in shape with a fore end 42 and a rear end 43. The central portion 26 may have a pair of fore mounting tabs 44, 45 that extend from opposite sides of the central member, and may extend laterally from the central member.

The hitch apparatus 10 may also include at least one actuator 50 to pivot the portions of the pivot frame with respect to each other, such as, for example, the rearward portion with respect to the central portion. The actuator 50 may be mounted to one of the fore mounting tabs 44, 45 and one of the rear mounting tabs 38, 39. The actuator may be located on a side of the portions of the pivot frame. In some of the most preferred embodiments, the hitch apparatus 10 may include a pair of actuators 50, 51 which may be located on opposite sides of the pivot frame, and each of the actuators may be mounted on one of the fore mounting tabs 36, 37 and one of the rear mounting tabs 42, 43. In some implementations, the actuators 50, 51 may comprise hydraulic cylinders, although other types of actuators may be employed, including extendable and retractable actuators. The actuators may act as substantially parallel links that extend and retract to pivot the central portion of the pivot frame laterally to the left with respect to the rearward portion 24 (see FIG. 2) into a shifted right condition of the rearward portion and the trailer connected to the rearward portion. Conversely, the actuators may act to pivot the central portion of the pivot frame laterally to the right with respect to the rearward portion 24 (see FIG. 3) into a shifted left condition of the rearward portion and the trailer connected to the rearward portion.

The hitch apparatus 10 may also include a sensor assembly 54 configured to detect a degree of pivot of the central portion 26 with respect to the rearward portion 24 (see FIGS. 1 through 4 and 7), and may provide information to the operator regarding the relative position of the trailer with respect to the towing vehicle. The sensor assembly 54 may comprise a sensor 56 which may be mounted on the pivot frame 20. In the illustrative embodiments, a portion of the sensor is mounted on the central portion 26 and a portion of the sensor is mounted on the rear portion 24, although other configurations may be employed that do not require the mounting arrangement described. The sensor 56 may be configured to detect changes in position of the portions of the sensor with respect to each other, which is indicative of changes in the positions of the portions of the pivot frame. The sensor assembly 54 may also include a display 58 that is in communication with the sensor 56 to display a representation of the relative portions of the portions of the pivot frame with respect to each other. The display may comprise a display screen, although other indicators may be employed such as a series of lights, bar graph, a moving needle, etc.

Figure 6:
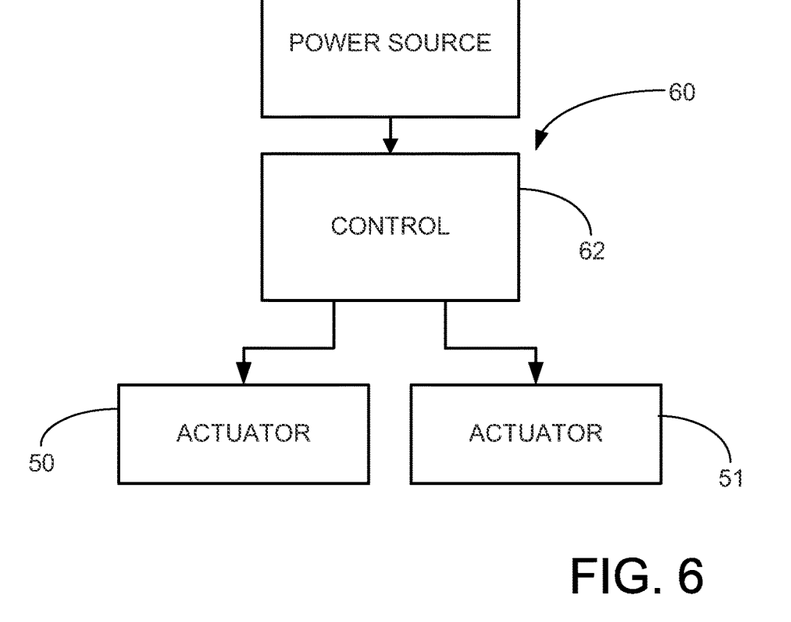
FIG. 6 is a schematic block diagram of a control assembly and actuators, according to an illustrative embodiment.
Figure 7:
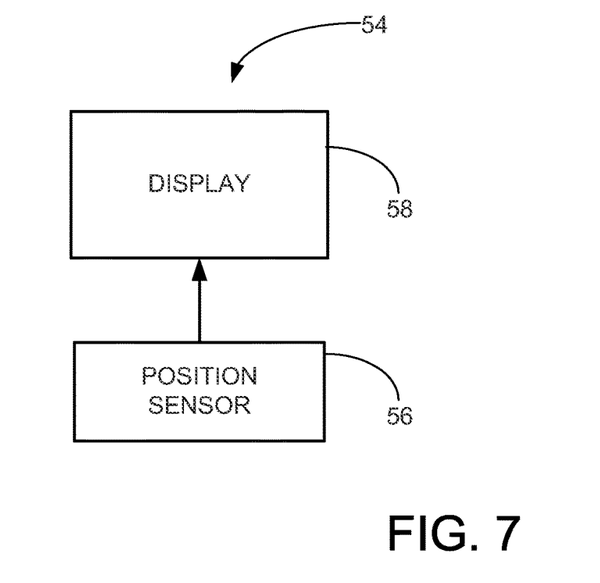
FIG. 7 is a schematic block diagram of a sensor assembly and actuators, according to an illustrative embodiment.

The hitch apparatus 10 may also include a control assembly 60 that is configured to control the actuators 50, 51 to thereby control pivoting of the portions of the pivot frame 20 with respect to each other. The control assembly 60 may be in communication with the one or two actuators to provide the actuators with power, including fluid power for hydraulic or pneumatic actuators, electrical power electrical linear actuators, etc. The control assembly 60 may include at least one control 62 configured to control flow of power (e.g., hydraulic fluid or electricity) to the actuator or actuators. The control 62 may be located relatively remote from the actuators 50, 51 and the pivot frame 20.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A hitch apparatus for laterally shifting a hitch point of a trailer when towed behind a towing vehicle to effectively adjust an alignment of a longitudinal axis of the trailer with respect to a longitudinal axis of the towing vehicle, the hitch apparatus including:
    a pivot frame extending between forward and rearward ends of the hitch apparatus, the pivot frame comprising:
        a forward portion configured for attachment to the towing vehicle, the forward portion including a hitch connector structure configured to removably attach to a hitch device of the towing vehicle;
        a rearward portion configured for attachment to the trailer; and
        a central portion pivotally connecting the forward and rearward portions together, the forward portion being pivotally connected to the central portion to pivot about a substantially vertical first axis and the rearward portion being pivotally connected to the central portion to pivot about a substantially vertical second axis; and
        a pair of actuators with each of said actuators being connected to the central portion and at least one other of said portions of the pivot frame to pivot at least two of said portions with respect to each other;
    wherein extension actuation of a first one of the actuators and retraction actuation of a second one of the actuators moves the forward portion of the pivot frame to a shifted left condition, and retraction actuation of the first actuator and extension actuation of the second actuator moves the forward portion of the pivot frame to a shifted right condition, with respect to the rearward portion and the trailer when the rearward portion is mounted on the trailer; and
    wherein the first and second actuators are each elongated with a longitudinal axis, the longitudinal axes of the actuators being oriented substantially parallel to each other in the shifted left condition and the shifted right condition;
    wherein the central portion includes an elongated central member which forms a single structural link pivotally connecting the forward portion and the rearward portion;
    wherein the first and second actuators are located on opposite sides of the central member such that the central member is located between the actuators and the actuators are each connected to a respective said side of the central member to thereby act on the opposite sides of the central member, the first and second actuators being oriented substantially parallel to a longitudinal axis of the central member in the shifted left condition and the shifted right condition;
    wherein the central member has an upper surface generally defining an upper horizontal plane and a lower surface generally defining a lower horizontal plane, and
    wherein an entirety of each of the actuators of the pair of actuators is located between the upper and lower horizontal planes of the upper and lower surfaces of the central member.

2. The hitch apparatus of claim 1 wherein the forward portion comprises an elongated forward member, and the rearward portion comprises an elongated rearward member; and
    wherein the forward member is pivotally connected to one end of the central member and the rearward member is pivotally connected to an opposite end of the central member.

3. The hitch apparatus of claim 1 wherein the hitch connector structure comprises a two point connector structure configured to removably attach to a two point hitch of the hitch device on the towing vehicle.

4. The hitch apparatus of claim 1 additionally comprising a sensor assembly configured to detect changes in position of portions of the sensor with respect to each other indicative of changes in the positions of the portions of the pivot frame.

5. The hitch apparatus of claim 4 wherein the sensor assembly includes a sensor mounted on the pivot frame and configured to detect pivoting of one said portion of the pivot frame with respect to another said portion of the pivot frame.

6. The hitch apparatus of claim 5 wherein a portion of the sensor is mounted on the central portion and a portion of the sensor is mounted on the rear portion.

7. The hitch apparatus of claim 1 additionally comprising a control assembly configured to control the at least one actuator to control pivoting of the portions of the pivot frame with respect to each other.

8. The hitch apparatus of claim 7 wherein the control assembly includes at least one control located remote from the pivot frame.

9. The hitch apparatus of claim 1 wherein the central portion has a pair of fore mounting tabs extending laterally outwardly from opposite sides of the central member in directions perpendicular to the longitudinal axis of the central member and the rearward member has a pair of rear mounting tabs extending from opposite sides of a rearward member of the rearward portion, each of the actuators being mounted on one of the fore mounting tabs and one of the rear mounting tabs with the central member being positioned between the actuators.

10. The hitch apparatus of claim 1 wherein the actuators comprise hydraulic cylinders.

11. The hitch apparatus of claim 1 wherein the forward portion comprises an elongated forward member, and the rearward portion comprises an elongated rearward member;
    wherein the forward member is pivotally connected to one end of the central member and the rearward member is pivotally connected to an opposite end of the central member;
    wherein the hitch connector structure comprises a two point connector structure configured to removably attach to a two point hitch of the hitch device on the towing vehicle;
    a control assembly configured to control the at least one actuator to control pivoting of the portions of the pivot frame with respect to each other, the control assembly including at least one control located remote from the pivot frame;

wherein the central member has an upper surface generally defining an upper horizontal plane and a lower surface generally defining a lower horizontal plane, and the actuators of the pair of actuators are located between the upper and lower horizontal planes;

wherein the central portion has a pair of fore mounting tabs extending laterally outwardly from opposite sides of the central member in directions perpendicular to the longitudinal axis of the central member and the rearward member has a pair of rear mounting tabs extending from opposite sides of a rearward member of the rearward portion, each of the actuators being mounted on one of the fore mounting tabs and one of the rear mounting tabs with the central member being positioned between the actuators; and wherein the actuators comprise hydraulic cylinders.

12. A hitch apparatus for laterally shifting a hitch point of a trailer when towed behind a towing vehicle to effectively adjust an alignment of a longitudinal axis of the trailer with respect to a longitudinal axis of the towing vehicle, the hitch apparatus including:

a pivot frame extending between forward and rearward ends of the hitch apparatus, the pivot frame comprising:

a forward portion configured for attachment to the towing vehicle, the forward portion including a hitch connector structure configured to removably attach to a hitch device of the towing vehicle;

a rearward portion configured for attachment to the trailer; and a central portion pivotally connecting the forward and rearward portions together, the forward portion being pivotally connected to the central portion to pivot about a substantially vertical first axis and the rearward portion being pivotally connected to the central portion to pivot about a substantially vertical second axis; and a pair of actuators with each of said actuators being connected to the central portion and at least one other of said portions of the pivot frame to pivot at least two of said portions with respect to each other;

wherein extension actuation of a first one of the actuators and retraction actuation of a second one of the actuators moves the forward portion of the pivot frame to a shifted left condition, and retraction actuation of the first actuator and extension actuation of the second actuator moves the forward portion of the pivot frame to a shifted right condition, with respect to the rearward portion and the trailer when the rearward portion is mounted on the trailer; and wherein the first and second actuators are each elongated with a longitudinal axis, the longitudinal axes of the actuators being oriented substantially parallel to each other in the shifted left condition and the shifted right condition;

wherein the central portion includes an elongated central member which forms a single structural link pivotally connecting the forward portion and the rearward portion;

wherein the first and second actuators are located on opposite sides of the central member such that the central member is located between the actuators and the actuators are each connected to a respective said side of the central member to thereby act on the opposite sides of the central member, the first and second actuators being oriented substantially parallel to a longitudinal axis of the central member in the shifted left condition and the shifted right condition; and a sensor assembly configured to detect changes in position of portions of the sensor with respect to each other indicative of changes in the positions of the portions of the pivot frame;

wherein the sensor assembly includes a sensor mounted on the pivot frame and configured to detect pivoting of one said portion of the pivot frame with respect to another said portion of the pivot frame; and wherein a portion of the sensor is mounted on the central portion and a portion of the sensor is mounted on the rear portion.

13. The hitch apparatus of claim 12 wherein the central member has an upper surface generally defining an upper horizontal plane and a lower surface generally defining a lower horizontal plane, and wherein an entirety of each of the actuators of the pair of actuators is located between the upper and lower horizontal planes of the upper and lower surfaces of the central member.

14. A hitch apparatus for laterally shifting a hitch point of a trailer when towed behind a towing vehicle to effectively adjust an alignment of a longitudinal axis of the trailer with respect to a longitudinal axis of the towing vehicle, the hitch apparatus including:

a pivot frame extending between forward and rearward ends of the hitch apparatus, the pivot frame comprising:

a forward portion configured for attachment to the towing vehicle, the forward portion including a hitch connector structure configured to removably attach to a hitch device of the towing vehicle;

a rearward portion configured for attachment to the trailer; and a central portion pivotally connecting the forward and rearward portions together, the forward portion being pivotally connected to the central portion to pivot about a substantially vertical first axis and the rearward portion being pivotally connected to the central portion to pivot about a substantially vertical second axis; and a pair of actuators with each of said actuators being connected to the central portion and at least one other of said portions of the pivot frame to pivot at least two of said portions with respect to each other;

wherein extension actuation of a first one of the actuators and retraction actuation of a second one of the actuators moves the forward portion of the pivot frame to a shifted left condition, and retraction actuation of the first actuator and extension actuation of the second actuator moves the forward portion of the pivot frame to a shifted right condition, with respect to the rearward portion and the trailer when the rearward portion is mounted on the trailer; and wherein the first and second actuators are each elongated with a longitudinal axis, the longitudinal axes of the actuators being oriented substantially parallel to each other in the shifted left condition and the shifted right condition;

wherein the central portion includes an elongated central member which forms a single structural link pivotally connecting the forward portion and the rearward portion;

wherein the first and second actuators are located on opposite sides of the central member such that the central member is located between the actuators and the actuators are each connected to a respective said side of the central member to thereby act on the opposite sides of the central member, the first and second actuators being oriented substantially parallel to a longitudinal axis of the central member in the shifted left condition and the shifted right condition;

wherein the central member has an upper surface generally defining an upper horizontal plane and a lower surface generally defining a lower horizontal plane; and wherein an entirety of each of the actuators of the pair of actuators is located between the upper and lower horizontal planes of the upper and lower surfaces of the central member.

* * * * *